(12) United States Patent
Tcherevik

(10) Patent No.: US 7,958,515 B2
(45) Date of Patent: Jun. 7, 2011

(54) PUBLISH/SUBSCRIBE MECHANISM FOR WEB SERVICES

(75) Inventor: Dmitri Tcherevik, Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1602 days.

(21) Appl. No.: 11/063,374

(22) Filed: Feb. 22, 2005

(65) Prior Publication Data

US 2006/0080120 A1   Apr. 13, 2006

Related U.S. Application Data

(63) Continuation of application No. 10/851,620, filed on May 21, 2004, now abandoned.

(60) Provisional application No. 60/473,323, filed on May 23, 2003.

(51) Int. Cl.
  *G06F 3/00* (2006.01)
(52) U.S. Cl. ........................................ 719/318
(58) Field of Classification Search .................. 719/318, 719/331
  See application file for complete search history.

(56) References Cited

U.S. PATENT DOCUMENTS

| | | | | |
|---|---|---|---|---|
| 6,298,378 | B1 * | 10/2001 | Angal et al. | 709/223 |
| 2003/0093403 | A1 | 5/2003 | Upton | 707/1 |
| 2003/0093471 | A1 * | 5/2003 | Upton | 709/203 |
| 2005/0004978 | A1 * | 1/2005 | Reed et al. | 709/203 |
| 2008/0294794 | A1 * | 11/2008 | Darugar et al. | 709/238 |

OTHER PUBLICATIONS

AP, A Publish/Subcribe Mechanism for Web Service, Feb. 2003.*
Warren Smith, Simple LDAP Schemas for Grid Monitoring, Jun. 6, 2001.*
Tcherevik, D., "*A Publish/Subscribe Mechanism for Web Services: Extending an Existing Broker*", Web Services Journal, 'Onlin!, vol. 03, No. 02, (7 pages), Feb. 2003.
"A Scaleable Event Infrastructure for Peer to Peer Grids", Fox et al.; *Proceedings of the 2002 Joint ACE-IScope Conference on Java Grande*, [Online], Seattle Washington; portal.acm.org/citation.cfm?id=583818>, Feb. 2003.
Summons to Attend Oral Proceedings Pursuant to Rule 71(1) EPC; Reference: HCD/J00048350EP; Application No./Patent No. 04753065.4-1527, Jun. 1, 2007.

* cited by examiner

*Primary Examiner* — Lechi Truong
(74) *Attorney, Agent, or Firm* — Baker Botts L.L.P.

(57) ABSTRACT

A method for managing events in a web service environment is provided. A request for a subscription to desired events in an event class in an associated catalog namespace of a catalog repository is received from a subscribing application. The subscription request includes an event filter to select the desired events from a plurality of events described by the event class. An event which is received from a web evens source and described by the event class is processed through the event filter. If the received event matches the event filter, the received event is forwarded to the subscribing application through an event listener associated with the subscribing application.

16 Claims, 5 Drawing Sheets

PUBLISH/SUBSCRIBE MECHANISM FOR WEB SERVICES

CROSS-REFERENCE TO RELATED APPLICATIONS

This application is a Rule 1.53(b) continuation and claims the priority of application Ser. No. 10/851,620, filed May 21, 2004, now abandoned which claims the benefit of U.S. provisional application 60/473,323 filed May 23, 2003 and entitled "A PUBLISH/SUBSCRIBE MECHANISM FOR WEB SERVICES", which is incorporated in its entirety herein by reference.

TECHNICAL FIELD

This application relates to web services. In particular, the application relates to a publish/subscribe mechanism for web services.

DESCRIPTION OF RELATED ART

The World Wide Web is widely recognized as a vast source of information. However, the Internet and the web are not merely an information source. The web is rapidly becoming a preferred medium for application software, and web services are emerging as the next generation platform for distributed application software.

Web services are web software, typically self-contained, self-describing and modular, that can be located and invoked across the web. Web services may perform functions ranging from simple requests to complex business processes. Once a web service is deployed, other applications and other web services typically can discover and invoke the deployed service. Web service platforms enable application software to communicate synchronously or asynchronously over standard Internet protocols, such as HTTP (HyperText Transfer Protocol), SOAP (Simple Object Access Protocol), UDDI (Universal Description, Discovery and Integration), etc. Web Services Description Language (WSDL) is an XML (extensible Markup Language) language that may be used to describe a web service and specify a manner of communicating with the web service. The specification is often referred to as a "WSDL contract".

The term "event" specific to the context of computer technology or the web means a change (or notification of change) in condition or state within a system. An event may be triggered by user operation through an interactive device (for example, a keystroke, a mouse button click, words spoken through a speech interface, etc.) or by operation of software.

Software platforms sometimes provide a publish/subscribe mechanism which can be used by application software to raise (publish) events or express interest (subscribe) in events which may be published by other application software. While use of the Internet and web services is proliferating, a publish/subscribe mechanism for web services to manage events over the web is still lacking.

SUMMARY

The term "event" as used herein should be construed in a manner consistent with its conventional meaning in a computer art or web context and/or to include a data object corresponding to the conventionally known event.

The subject application provides a method for managing events in a web service environment. In one embodiment, the method includes receiving from a subscribing application a request for a subscription to desired events in an event class, the subscription request including an event filter to select the desired events from a plurality of events described by the event class, registering an event listener associated with the subscribing application, processing through the event filter an event which is received from an event source and is described by the event class, and notifying the subscribing application of the received event through the registered event listener, if the received event matches the event filter.

The application also provides an apparatus for managing events in a web service environment. In one embodiment, the apparatus includes a catalog repository and a publish/subscribe web service. The catalog repository includes one or more catalog namespaces. The publish/subscribe web service includes a subscription management component and an event processing component. The subscription management component receives from a subscribing application a request for a subscription to desired events in an event class in a catalog namespace of the catalog repository. The subscription request includes an event filter to select the desired events from a plurality of events described by the event class. The subscription management component registers an event listener associated with the subscribing application. The event processing component processes an event which is received from an event source, and, if the received event is described by the event class and matches the event filter, forwards the received event to the subscribing application through the registered event listener.

The methods and apparatus of the present disclosure may be embodied in a program of instructions executable by a machine (such as a computer or computer system) which is stored in a storage medium or transmitted in one or more segments in a transmission medium.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methods, apparatus and system) for managing events in a web service environment, including a publish/subscribe mechanism for web services.

Figure 1:
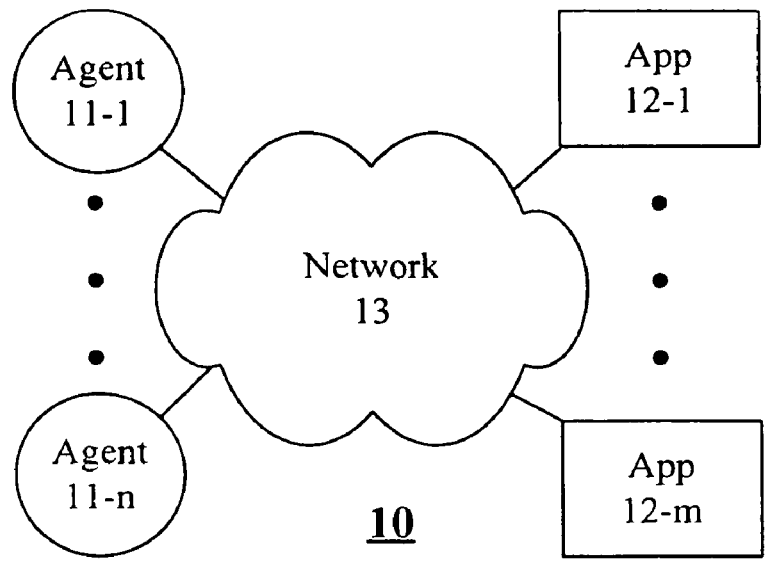
FIG. 1 shows a block diagram of an exemplary system which may use a publish/subscribe service.

There are many types of systems in a distributed applications environment that can use a publish/subscribe service. FIG. 1 presents a high-level view of an exemplary system (referred to below as "CAM") in which agents technology is used to collect information for the applications. CAM system 10 includes a number of agents 11 (11-1 through 11-*n*) and some management applications 12 (12-1 through 12-*m*) connected through network 13.

The agents 11 monitor their environment and send status messages to the management applications.

The system management applications 12 may include, for example, enterprise management, security, storage, data management, portal, intelligence add-on, etc. The applications process information collected through the agents and make system management decisions either automatically or with help of a human operator. The decisions may be mapped to actions performed by the agents.

A number of types of communications may take place between the agents 11 and the management applications 12. For example, streams of system status messages may flow from the agents to the management applications. In addition, there may be streams of control messages flowing back from the management applications to the agents.

A control message typically has a well defined source and a well defined destination. Therefore, it can be delivered using a traditional one-to-one request and/or reply protocol [for example, RPC (Remote Procedure Call) mechanisms, such as IIOP (Internet Inter-ORB Protocol), Java RMI (Remote Method Invocation), COM (Component Object Model), or SOAP-RPC].

Status messages sent by agents typically are, caused by changes in the environment (for example, events) and are therefore asynchronous by nature. In addition, an agent sending a message is generally decoupled from the management applications and rarely knows the applications receiving the message. There can be many management applications receiving messages from a single agent. Therefore, the sending of status messages is typically an asynchronous, one-to-many type of messaging which generally cannot be carried over a traditional RPC link. Instead, a publish/subscribe mechanism is used.

Figure 2:
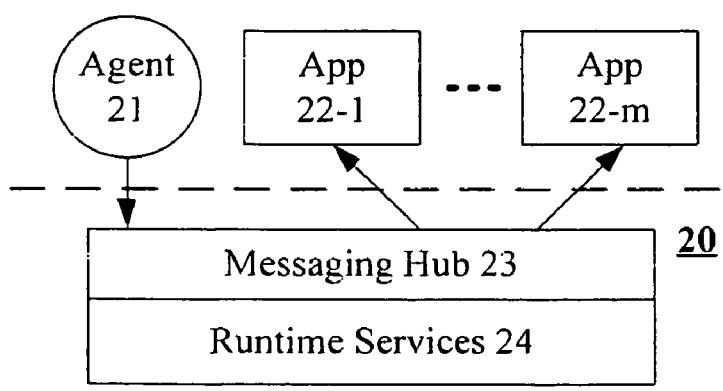
FIG. 2 shows a schematic diagram of a publish/subscribe framework for the system shown in FIG. 1.

The architecture of a publish/subscribe framework for the CAM system is shown in FIG. 2. Publish/subscribe framework 20 includes a messaging hub 23 and runtime services 24.

The messaging hub 23 includes a store and forward messaging mechanism that provides asynchronous and synchronous APIs (Application Program Interfaces) for sending and receiving messages. Events may be delivered from agents 21 to the messaging hub 23, and then from the messaging hub 23 to event subscribers 22, such as an event console, an object repository, an application, etc. In addition, the messaging hub 23 implements event advertising, routing, and filtering functions.

Runtime services 24 form the "engine room" of the framework to scale, extend and perform to the demands of the system. In addition to publish/subscribe services, runtime services 24 may also provide other services, such as cache management, catalog management (for example, object mapping), etc.

Other frameworks similar to the CAM publish/subscribe framework are also conventionally known. Many of the frameworks use conventional, proprietary messaging platforms (for example, such as MSMQ from Microsoft or MQSeries from IBM) to send and receive messages. The conventional messaging platforms may provide a capability of sending messages over HTTP. For example, a SOAP request can be sent typically as a message through one of the conventional messaging platforms via HTTP tunneling, However, an application that sends messages via HTTP tunneling through a conventional messaging platform misses a main benefit of web services, i.e. interoperability. Interoperability means two or more software work together without requiring significant alterations and with the interface between the software being transparent to the end user. For example, interoperability may include exchanging data files between the software. In addition, a software having interoperability which is written for one computer platform can run without modification on other platforms.

In order to send a SOAP message from, for example, a wireless device through one of the conventional messaging platforms, the client side library of the conventional proprietary platform generally must already be deployed on the wireless device. Therefore, conventional messaging platforms allow only limited interoperability, and a publish/subscribe framework based on a conventional messaging platform is significantly limited in a heterogeneous environment.

It is desirable to have a publish/subscribe framework available as a web service, and for client applications to be able to locate and invoke the publish/subscribe service with help of ubiquitous Internet protocols (such as HTTP, SOAP, and UDDI), in order to render the framework more suitable for use by web services, Some exemplary embodiments of methods and apparatus for managing events in a web service environment are described below.

Figure 3:
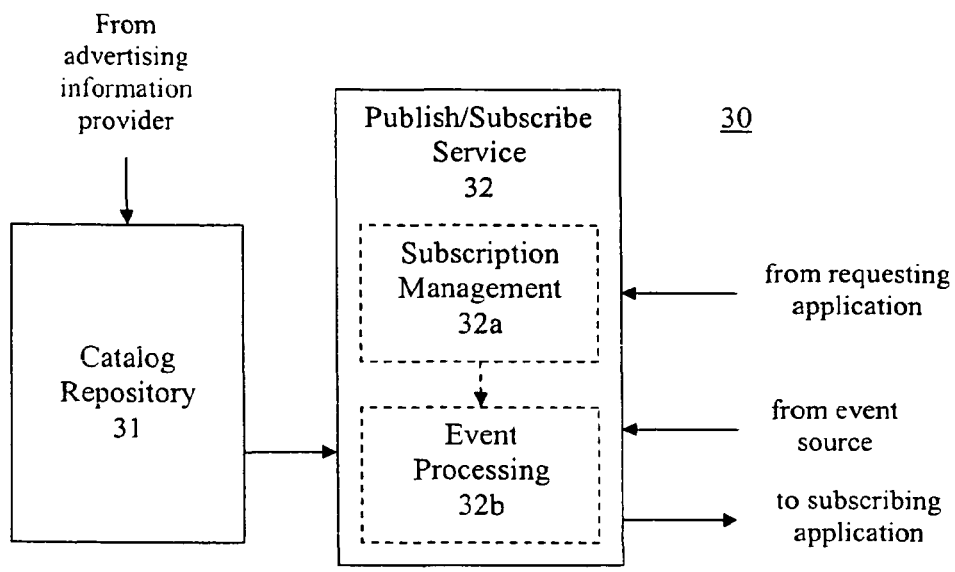
FIG. 3 shows a block diagram of an apparatus, according to one embodiment, for managing events in a web service environment.

An apparatus 30 for managing events in a web service environment, according to one embodiment (FIG. 3), includes a catalog repository 31 and a publish/subscribe web service 32. The catalog repository 31 includes one or more catalog namespaces. The publish/subscribe web service 32 includes a subscription management component 32*a* and an event processing component 32*b*. The subscription management component 32*a* receives from a subscribing application a request for a subscription to desired events in an event class in a catalog namespace of the catalog-repository 31. The subscription request includes an event filter to select the desired events from a plurality of events described by the event class. The subscription management component 32*a* registers an event listener associated with the subscribing application. The event processing component 32*b* processes an event which is received from an event source, and, if the received event is described by the event class and matches the event filter, forwards the received event to, or notifies, the subscribing application through the registered event listener.

The apparatus may optionally further comprise an event gateway. The event processing component receives the event through the event gateway from a web event source over the Internet through an Internet protocol, and forwards the received event through a local messaging protocol to a local subscriber if the received event matches an event filter included in a subscription request of the local subscriber.

Figure 4:
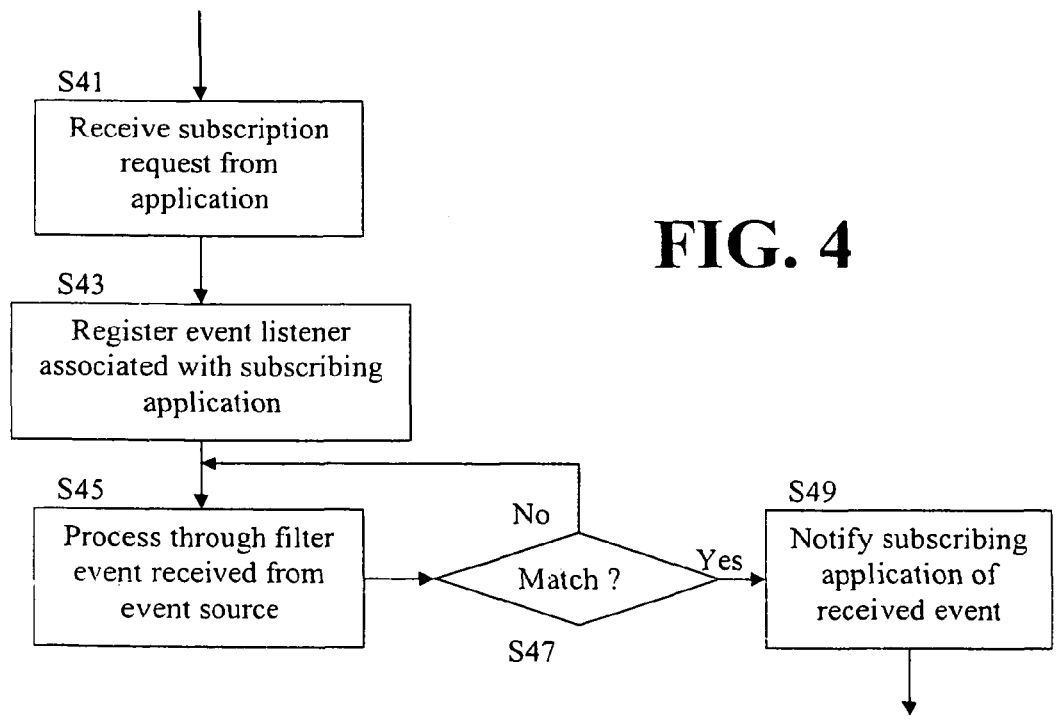
FIG. 4 shows a flow chart of a method for managing events in a web service environment, according to one embodiment.

A method for managing events in a web service environment, according to one embodiment (FIG. 4), includes receiving from a subscribing application a request for a subscription to desired events in an event class in an associated catalog namespace of a catalog repository (step S41), the subscription request including an event filter to select the desired events from a plurality of events described by the event class, registering an event listener associated with the subscribing application (step S43), processing through the event filter an event which is received from an event source and is described by the event class (step S45), and notifying the subscribing application of the received event through the registered event listener (step S49), if the received event matches the event filter (step S47, "Yes"). The method is preferably implemented through a web service. The event listener may identify an endpoint of the subscribing application. The event filter may be a query defined on the event class.

The subscribing application may be a web application (for example, in a conventional client-server configuration). Alternatively, the application may be locally resident on a computing platform which provides web access and/or network access.

The subscription request may also include an endpoint of the subscribing application, and the received event is forwarded to the endpoint if the received event matches the event filter. The subscription request may further Include (a) a name of the event class, which describes the desired events, and (b) a path of the catalog namespace in which the event class is defined. The subscribing application may determine (a) the name of the event class which describes the desired events and (b) the path of the catalog namespace in which the event class is defined, by retrieving a handle to the event class from the catalog repository. Thus, a subscribing application can easily locate and invoke the subscribe service. The method may further comprise receiving a subscription request from a local subscriber, and notifying the local subscriber of the received event through a local messaging protocol if the received event matches the event filter.

The method may further comprise defining the event class in a schema of the associated catalog namespace of the catalog repository to advertise the plurality of events described by the event class.

The method may further comprise receiving the event from the web event source over the Internet through an Internet protocol. The subscribing application may be notified of the received event over the Internet through an Internet protocol. The method may further comprise decoding the received event, creating an event object associated with the received event as a member of the event class describing the received event, and broadcasting the event object through registered event listeners to subscribing applications. Alternatively, the web event source may create the event object, and either forward the event object or a handle to the event object, to the web service.

A software application deployed on the web can easily raise an event by simply posting, for example, a SOAP message to an HTTP endpoint associated with the event class.

A web service which incorporates a publish/subscribe framework, according to one embodiment of the present disclosure, is outlined below.

Figure 5:
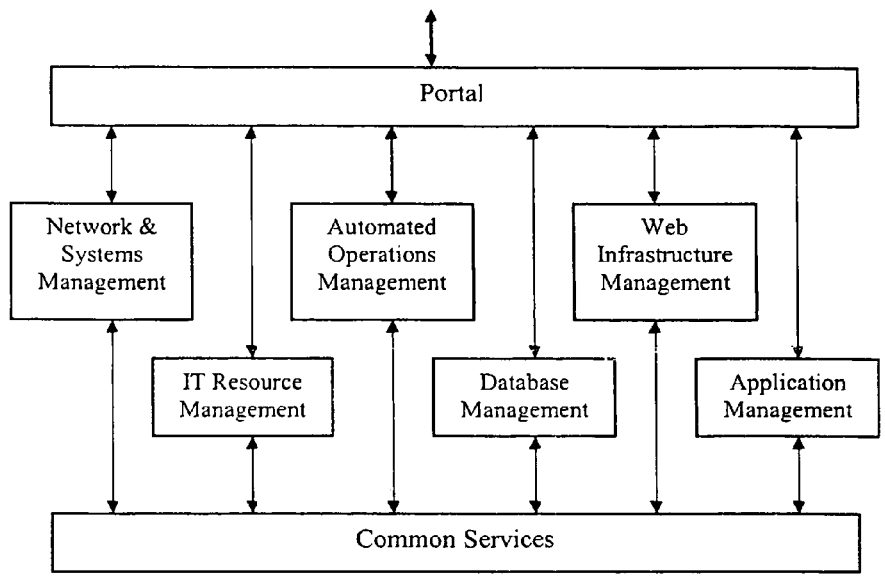
FIG. 5 shows a block diagram of an enterprise management system.

An event management mechanism with a publish/subscribe framework, as described herein, may be integrated in, for example, an enterprise management portal system (FIG. 5). The system provides, through a portal, distributed services including one or more enterprise management applications, such as network and system management, automated operations management, IT (information technology) resource management, database management, web infrastructure management, application management, etc. A common services component of the system is included to enable integration, efficient management, a consistent administration interface and ease of use of the management applications. The common services include runtime services, which perform an array of services to support the distributed nature of the system, including catalog management, object caching and event services. The common services include an event management facility with a straightforward API (application programming interface) that can be used to advertise available event types, subscribe for events, and to raise events in namespaces corresponding to various information providers.

Interaction between application and web service will be described with reference to FIGS. 6A-8B.

Figure 6A:
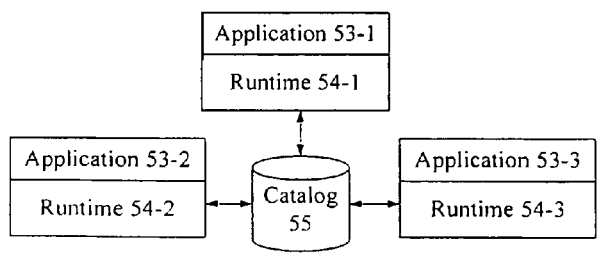
FIG. 6A shows a schematic diagram of interaction between applications and the publish/subscribe web service.

Each application (53-1, 53-2, 53-3, etc. in FIG. 6A) which accesses the web service has an associated instance of the runtime services (54-1, 54-2, 54-3 in FIG. 6A). Each instance of the runtime services can connect to a catalog repository 55 that contains meta-data describing data, events, and services offered by various information providers. An agent, a relational database, a file system folder, an application, etc., are all examples of information providers.

Meta-data information stored in the catalog is structured as a collection of namespaces. A catalog namespace contains a schema and a collection of other namespaces. The schema of a namespace consists of classes that describe events, objects, and services available from the corresponding information provider.

Figure 6B:
FIG. 6B shows a schematic diagram of a fragment of a catalog namespace tree.
Figure 7A:
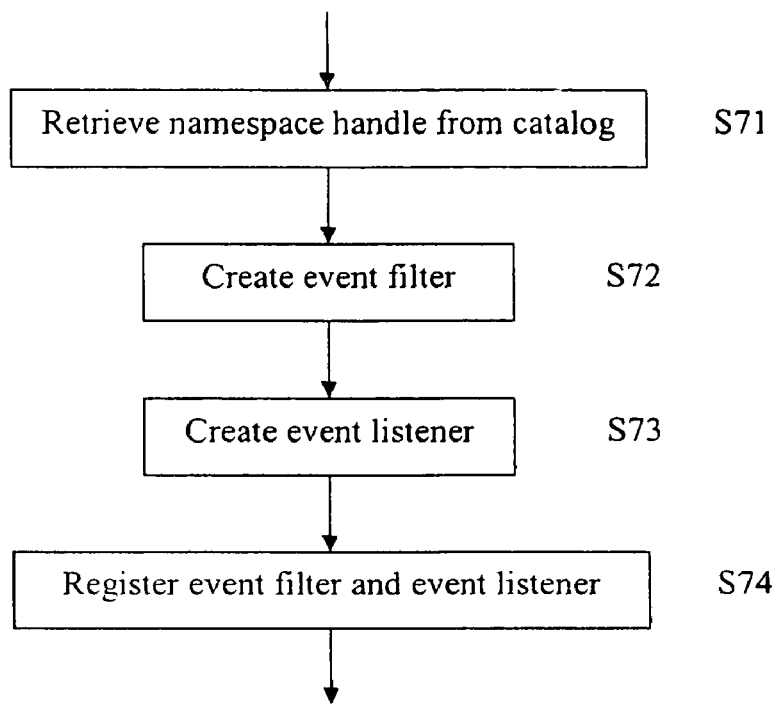
FIG. 7A shows a flow chart of a subscription process, according to one embodiment.
Figure 7B:
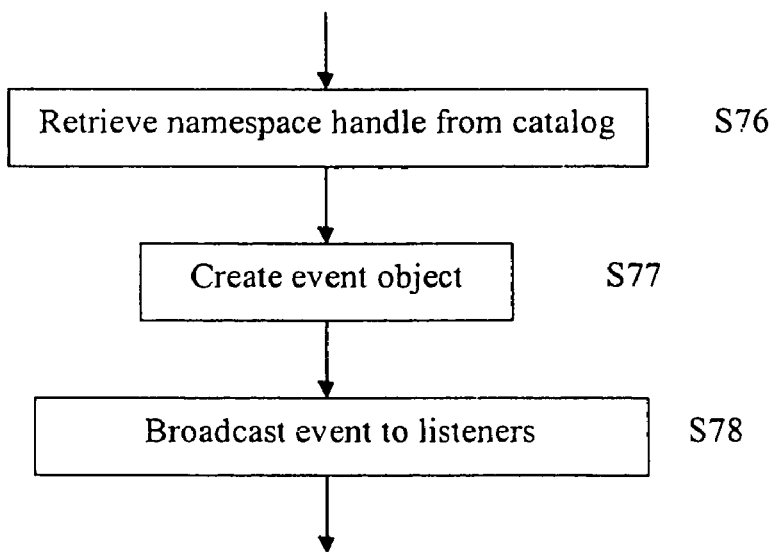
FIG. 7B shows a flow chart of a process for sending an event, according to one embodiment.

A fragment of a catalog namespace tree is portrayed in FIG. 6B, which shows a few exemplary catalog namespaces. One of the namespaces (the one that is expanded in FIG. 6B) corresponds to a file system provider. The schema of the namespace contains four classes. One of the classes describes the type of objects located in the namespaces. The name of the class is "File". The remaining three classes describe the types of events that can be inserted in the namespace. The names of the classes are self explanatory. Each of the event classes may have several properties describing events.

If an information provider (for example, 53-1, 53-2, 53-3 in FIG. 6A) wishes to advertise its events in a certain namespace, it can create one or more event classes in the schema of that namespace through the associated instance of the runtime services. This information is stored in the catalog 55 and can be examined by any application (for example, 53-1, 53-2, 53-3, etc.) that has sufficient security privileges.

An application (for example, 53-1, 53-2, 53-3, etc.) can subscribe to events described by an event class and originating in a namespace, by specifying the path of the namespace and the name of the event class. For example, the application can retrieve a handle to the namespace from the catalog and create an event filter (through the associated instance of the runtime services. The event filter may be a query defined on the event class. The subscribing application registers the event filter and an object that implements an event listener interface with the associated instance of the runtime services. The subscription process (FIG. 7A) is illustrated by the following exemplary code fragment:

```
// Retrieve the namespace handle from the catalog (step S71)
INamespace eventSource = (INamespace) root.find("File System
Provider");
// Create an event filter (step S72)
IQuery filter = (IQuery)eventSource.create("FileCreatedEvent",
ItemType.IT_Query);
filter.setQueryExp("path like '%.doc'");
// Create an event listener object (step S73)
MyEventListener listener = new MyEventListener( );
// Register the filter and the listener object with the
runtime system (step S74)
Main.subscribe(listener, filter);
```

An event listener object implements the event listener interface which may be defined, for example, as follows:

```
public interface IEventListener
{
    public void handleEvent(IEvent event);
}
```

When an event matching the filter is detected by the runtime system, the handleEvent( ) method of the listener object which receives the event object as an argument is invoked.

An application sending an event may first create an event object and then use the raise( ) method of the runtime services to broadcast this event to listeners, such as exemplified by the following code fragment (FIG. 7B):

```
// Retrieve the namespace handle from the catalog (step S76)
INamespace eventSource = (INamespace) root.find("File System Provider");
// Create an event object and set its properties (step S77)
IEvent event = (IEvent) eventSource.create("FileCreatedEvent", ItemType.IT_Event);
event.setPropertyValue("path", "/Docs/Important Paper.doc");
// Broadcast the event to local and remote listeners (step S78)
Main.raise(event);
```

The runtime services ensure that remote and local listeners are notified. For example, events may propagate events between instances of the common services runtime system.

There are several ways to encode information in the body of a SOAP message. For example, it can be encoded either as an RPC call or as an XML document. The style of encoding may be controlled by a switch in a WSDL contract for the service. The body of a SOAP message sent to an operation which is encoded as an RPC call may be declared as follows:

```
<soap:operation soapAction="uri" style="rpc">
 ... ...
</soap:operation>
```

The body of a message sent to an operation which is encoded and interpreted as an XML document may be declared as follows:

```
<soap:operation soapAction="uri" style="document">
 ... ...
</soap:operation>
```

There are strict rules governing how parameters of an RPC request are to be encoded in the body of a SOAP message. Document style encoding, on the other hand, is very non-restrictive and allows virtually any type of XML documents. When flexibility or extensibility is desired, document style encoding is generally preferred.

The method of the runtime services which is used to subscribe for events is static in nature. Therefore, it can be safely mapped to an operation with RPC encoding.

The raise( ) method, on the other hand, is dynamic. Event objects passed to this method are defined by classes stored in the catalog repository. Since it is difficult to recompile an application each time a new event class is added to the catalog, document style encoding, is preferably used for the raise( ) operation.

The XML format for encoding events in a SOAP message may be defined as follows:

```
<env:Envelope
xmlns:env="http://schemas.xmlsoap.org/soap/envelope"
        xmlns:xsi="http://www.w3.org/2001/XMLSchema-instance">
    <env:Body>
        <ccs:raise xmlns:ccs="http://ccs.ca.com">
            <ev:FileCreatedEvent
                xmlns:ev="http://ccs.ca.com/Root/File System Provider">
                <path xsi:type="xsd:string">/Docs/Important Paper.doc</path>
            </ev:FileCreatedEvent>
            <ev:FileDestroyedEvent
                xmlns:ev="http://ccs.ca.com/Root/File System Provider">
                <path xsi:type="xsd:string">/Docs/Junk Paper.doc</path>
            </ev:FileDestroyEvent>
        </ccs:raise>
    </env:Body>
</env:Envelope>
```

Multiple events may be encoded as part of a single SOAP message, in order to reduce the number of network roundtrips. Each event is mapped to an XML element. The name of this element corresponds to the name of the class describing the event. Different namespaces in the catalog may contain event classes with identical names. Names of event elements may be qualified by placing them in different XML namespaces. The URL of an XML namespace containing the name of an event element may be derived from the path of the namespace containing the corresponding event class. The mapping is very simple. If the path of a namespace is "Root/File System Provider" then the URL of the corresponding XML namespace is "http://ccs.ca.com/Root/File System Provider". Properties of event objects are mapped to elements nested in the event element. Property values are encoded as strings. The original type of a property is indicated in the value of the "xsi:type" attribute.

A portion of the public/subscribe service for processing events submitted over SOAP/HTTP by external applications may be implemented as a servlet extending the JAXMServlet class defined in JAXM, one of the standard Java APIs for web services. The onMessage( ) method of this servlet can be written as follows:

```
public SOAPMessage onMessage(SOAPMessage requestMsg)
{
    ...
    SOAPEnvelope requestEnv = requestMsg.getSOAPPart( ).getEnvelope( );
    SOAPHeader requestHeader = requestEnv.getHeader( );
    SOAPBody requestBody = requestEnv.getBody( );
    SOAPElement raiseElem = (SOAPElement)
        requestBody.getChildElements( ).next( );
    // Decode events and forward them to the runtime system
    IEvent [ ] events = SOAPCodec.decodeEventList(requestEnv, raiseElem);
    for (int k = 0; k < events.length; k ++)
    {
        // Raise the event in the runtime system
        Main.raise(events[k]);
    }
```

-continued

```
       // Compose the response message
       SOAPMessage responseMsg =
    messageFactory.createMessage( );
       ...
       return responseMsg;
    }
```

Figure 8A:
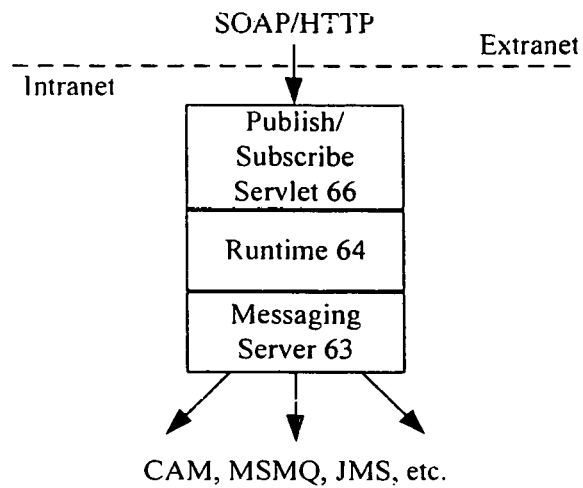
FIG. 8A shows a schematic diagram of a publish/subscribe framework with an intranet/extranet event gateway, according to one embodiment of the present application.

With help of a servlet capable of processing events encoded as SOAP messages, an event gateway may be provided to allow applications located outside of a company firewall to send events to subscribers deployed on the internal company network (FIG. 8A). When an outside application submits a SOAP message to the gateway, these subscribers receive, for example, CAM, MSMQ, or JMS (Java Message Service) messages. Thus, events can be, received over SOAP/HTTP and translated to events in the common services runtime system.

In addition, the publish/subscribe service may be adapted to forward events received from the common services runtime system to external web based event subscribers (FIG. 8B), such as by implementing an event listener class as shown below:

```
    public class EventListener implements IEventListener
    {
       private String endpoint; // end point of a web based
    listener
       public void handleEvent(IEvent event)
       {
          ...
          SOAPConnection connection =
    connectionFactory.createConnection( );
          SOAPMessage requestMsg =
    messageFactory.createMessage( );
          SOAPEnveloper soapEnv =
    requestMsg.getSOAPPart( ).getEnvelope( );
          SOAPBody soapBody = soapEnv.getBody( );
          SOAPBodyElement command = soapBody.addBodyElement(
             soapEnv.createName("raise", "ccs",
    "http://ccs.ca.com"));
          SOAPCodec.encodeEventList(soapEnv, command, new
    IEvent [ ] { event });
          requestMsg.saveChanges( );
          SOAPMessage responseMsg =
    connection.call(requestMsg, endpoint);
          connection.close( );
          ...
       }
       ...
    }
```

Figure 8B:
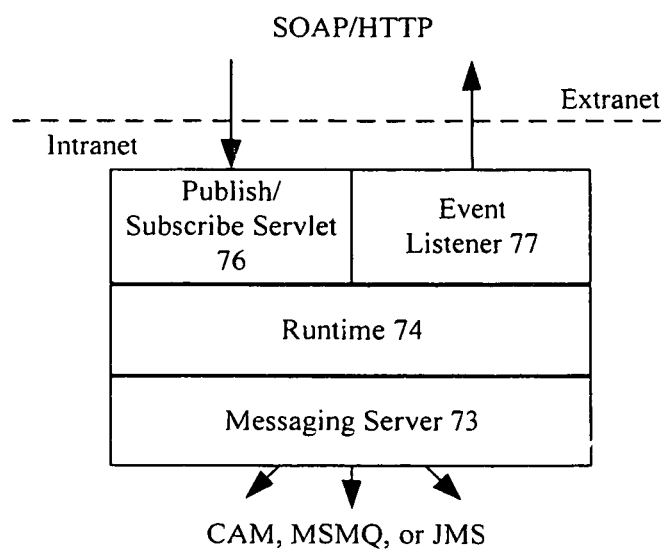
FIG. 8B shows a schematic diagram of a publish/subscribe framework adapted to forward received events to external subscribers, according to one embodiment of the present application.

Accordingly, web based applications can use the publish/subscribe service to send and receive events. In addition, the publish/subscribe service can play the role of a gateway translating event messages between SOAP/HTTP and messaging protocols used on local networks such as MSMQ, JMS, or CAM (FIG. 8B).

As described above, RPC encoding may be used for the subscribe( ) operation of the service. In addition, a WSDL contract may be defined for this operation. Once the contract is ready, a WSDL compiler can be used to generate client side and server side stubs for automatic encoding and decoding of SOAP messages.

A WSDL document may be written in XML and consist of many interrelated sections. Most web services development kits are capable of generating a WSDL contract from an interface defined in a conventional programming language such as Java or C#. The following subscription management interface, defined in Java, takes advantage of this capability:
    public class Subscription

```
    {
       public String endpoint; // an endpoint used to receive
    events
       public String nsppath; // path of a namespace
    containing the event class
       public String classname; // name of an event class
       public String filter; // a query expression for
    filtering events
    }
    public interface IEventManager
    {
       public void subscribe(Subscription [ ] subscriptions);
       public void unsubscribe(String endpoint);
    }
```

An application can subscribe for events from the publish/subscribe service by submitting one or more subscription objects. Each subscription object carries a number of properties, such as the following examples: an endpoint at which the application is listening for events (e.g. http://myapp.org:8080/listener); the path of a namespace in the catalog (e.g. "Root/File System Provider"); the name of an event class defined in this namespace (e.g. "FileCreatedEvent"); a query expression used to filter events (e.g. "path like '%.doc'").

Once the communication stubs are generated with a WSDL compiler, the IEventManager interface for the subscription management service can be implemented as follows:

```
    public class EventManager implements IEventManager
    {
       public void subscribe(Subscription [ ] subs)
       {
          ...
          for (int k = 0; k < subs.length; k ++)
          {
             // locate the event source namespace in the
    catalog
             INamespace nsp = root.find(subs[k].nsppath);
             // create an event filter
             IQuery q = (IQuery)
    nsp.create(subs[k].classname, ItemType.IT_Query);
             q.setQueryExp(subs[k].filter);
             // create an event listener object
             EventListener lsn = new
    EventListener(subs[k].endpoint);
             // register the listener object with the runtime
    system
             Main.subscribe(lsn, q);
          }
       }
       ...
    }
```

When a subscription request arrives from a web client, its endpoint may be used to create a new event listener object. The listener object and the event filter provided as part of the subscription request may then be registered with the common services runtime system. When an event matching the subscription criteria occurs in the runtime system, the handleEvent( ) method of the event listener is invoked by the event manager. The method encodes the event in SOAP/XML and posts it to the endpoint provided by the subscriber.

A publish/subscribe web service, according to the subject application, can be used by applications deployed on the Internet, for example, to subscribe for, send, and receive events using ubiquitous Internet protocols. In addition, the service can work as a gateway between SOAP/HTTP and traditional messaging protocols such as JMS, MSMQ, MQSeries and others. The publish/subscribe service can be used in a large number of applications which use asynchronous one-to-many messaging, for example, system monitoring and management, information replication, instant messaging, peer-to-peer computing, and others. The service may be implemented as an extension of an existing publish/subscribe framework with help of an off-the-shelf web services development kit.

The above specific embodiments are illustrative, and many variations can be introduced on these embodiments without departing from the spirit of the disclosure or from the scope of the appended claims.

For example, the following variations may be introduced: event objects may be encoded in SOAP; event objects encoded in SOAP may be sent over a protocol other than HTTP; events may be sent directly from producer to consumer, while bypassing the broker; other event filtering mechanism may be used; etc.

Elements and/or features of different illustrative embodiments may be combined with each other and/or substituted for each other within the scope of this disclosure and appended claims.

What is claimed is:

1. A computerized method for managing events in a web service environment, comprising:
    receiving at a web service process on a computer system from a subscribing application a request for a subscription to desired events in an event class in an associated catalog namespace of a catalog repository, the subscription request including an event filter to select the desired events from a plurality of events described by the event class;
    registering, by the web service process on the computer system, an event listener associated with the subscribing application;
    processing, by the web service process on the computer system, through the event filter an event which is received from an event source and is described by the event class, the event received through an event gateway from the event source over the Internet through an Internet protocol;
    notifying, by the web service process on the computer system, the subscribing application of the received event through the registered event listener, if the received event matches the event filter; and
    forwarding the received event through a local messaging protocol to a local subscriber if the received event matches an event filter included in a subscription request of the local subscriber.

2. The method of claim 1 further comprising defining the event class in a schema of the associated catalog namespace of the catalog repository to advertise the plurality of events described by the event class.

3. The method of claim 1, wherein the method is implemented through a web service.

4. The method of claim 1, wherein the subscription request also includes an endpoint of the subscribing application, and the received event is forwarded to the endpoint if the received event matches the event filter.

5. The method of claim 1, wherein the subscription request also includes a name of the event class, which describes the desired events, and a path of the catalog namespace in which the event class is defined.

6. The method of claim 5, wherein the subscribing application retrieves a handle to the event class from the catalog repository to determine (i) the name of the event class which describes the desired events and (ii) the path of the catalog namespace in which the event class is defined.

7. The method of claim 1, wherein the event filter is a query defined on the event class.

8. The method of claim 1, wherein the event listener identifies an endpoint of the subscribing application.

9. The method of claim 1, wherein the subscribing application is notified of the received event over the Internet through an Internet protocol.

10. The method of claim 1 further comprising decoding the received event, creating an event object associated with the received event as a member of the event class describing the received event, and broadcasting the event object through registered event listeners.

11. The method of claim 1, wherein the event source raises the event by posting a message to an endpoint associated with the event class.

12. The method of claim 1 further comprising receiving a subscription request from a local subscriber, and notifying the local subscriber of the received event through a local messaging protocol if the received event matches the event filter.

13. A computer system, comprising:
    a processor; and
    a program storage device readable by the computer system, tangibly embodying a program of instructions executable by the processor to perform the method claimed in claim 1.

14. A program storage device readable by a machine, tangibly embodying a program of instructions executable by the machine to perform the method claimed in claim 1.

15. One or more computer-readable non-transitory storage media embodying software this is operable when executed by one or more computer systems to:
    receive from a subscribing application a request for a subscription to desired events in an event class in an associated catalog namespace of a catalog repository, the subscription request including an event filter to select the desired events from a plurality of events described by the event class;
    register an event listener associated with the subscribing application;
    process, through the event filter, an event which is received from an event source and is described by the event class, the event received through an event gateway from the event source over the Internet through an Internet protocol;
    notify the subscribing application of the received event through the registered event listener, if the received event matches the event filter; and
    forward the received event through a local messaging protocol to a local subscriber if the received event matches an event filter included in a subscription request of the local subscriber.

16. An apparatus for managing events in a web service environment, comprising:
    a processor;
    a catalog repository comprising one or more catalog namespaces; and
    a publish/subscribe web service including a subscription management component and an event processing component, the publish/subscribe web service being embodied on a computer-readable medium and having instructions for causing the processor to perform operations comprising:
        receiving at the subscription management component from a subscribing application a request for a subscription to one or more desired events in an event class in a catalog namespace of the catalog repository, the subscription request including an event filter to select the one or more desired events from a plurality of events described by the event class;

registering, by the subscription management component, an event listener associated with the subscribing application; and processing, by the event processing component, an event which is received from an event source, and, if the received event is described by the event class and matches the event filter, notifying the subscribing application of the received event through the registered event listener; and an event gateway, wherein the event processing component is operable to:

receive the event through the event gateway from a web event source over the Internet through an Internet protocol; and forward the received event through a local messaging protocol to a local subscriber if the received event matches an event filter included in a subscription request of the local subscriber.

* * * * *